May 19, 1942. E. M. CONCONI 2,283,883
METHOD OF PREPARING OLIGODYNAMIC FILTERS
Filed June 21, 1939
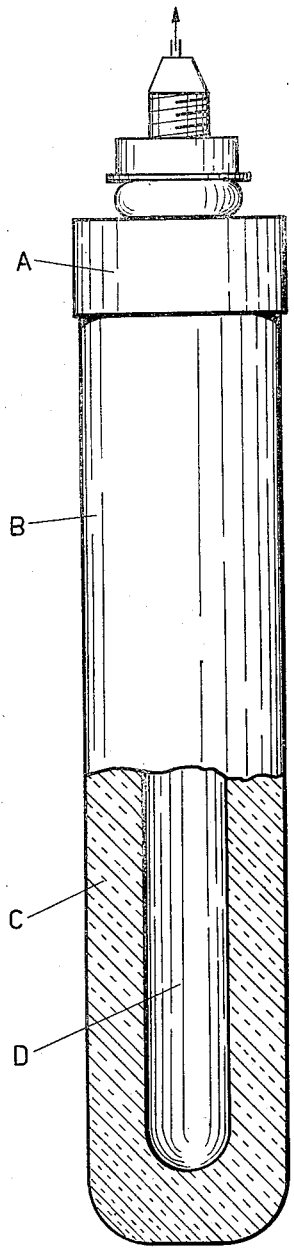
Inventor
Ernesto M. Conconi
By Sommers & Young
Attys

UNITED STATES PATENT OFFICE 2,283,883

METHOD OF PREPARING OLIGODYNAMIC FILTERS

Ernesto Mario Conconi, Milan, Italy, assignor to "Sacora" Soc. An. Commercio Olii Rappresentanze Autotrasporti, Milan, Italy Application June 21, 1939, Serial No. 280,425
In Italy July 27, 1938

3 Claims. (Cl. 210—205)

The present invention relates to methods of preparing oligodynamic filters adapted to operate for an unlimited period of time ensuring complete sterility of the filtered liquids and total destruction of bacteria and musts.

It is known that the sterilizing action of the usual filters is due to the fact that their chemical and physical character, such as the fineness of the pores of the filtering mass, prevents the passage of microbes in general, either pathogen or saprophytes, as well as other impurities whereby the same cannot pass with the filtered liquid.

In a short time, however, the surface of an ordinary filter in contact with the raw liquid is incerasingly covered with germs and substances which promote the development of bacterial colonies, thus creating at the outside of the filter a real culture whereby the germs, by reproduction, pass through the porous wall and infect the filtered liquids.

It has been attempted to eliminate said inconvenience by resorting to the scientific principle of the oligodynamic action of metals, especially pure silver, which, by contact only, have the power of killing the monocellular organisms. Said action is obviously directly proportional to the surface of contact with the material to be sterilized and to the time of contact. The usual manner of attempting to make use of this action, with results, however, absolutely insufficient, consisted in bringing the liquid in contact with a loose mass provided with oligodynamic metal, so as to subject the liquid to a plurality of passages through the filter and thus an extensive contact with the metal, whereby the surface and time of contact were increased.

In the practice of this method, sterilization took place within the liquid owing to the bactericide metallic ions, said ions remaining in the liquid, as it has been definitely verified that in order for sterilization to take place, it is necessary that a charge of metal in the ionic state of at least 50 (fifty) gamma per liter be present in the liquid.

The principal drawback afforded by such filters lies in that the effect is limited as to time, as after a few hours a contamination of the porous mass takes place and some of the impurities pass into the filtered liquid.

According to this invention, however, it is possible to make oligodynamic action filters of practically unlimited duration. The filter according to the invention is characterised essentially by the fact that it consists of fine porous material (siliceous, or porcelain-like, or vitreous and the like materials) impregnated with oligodynamic metal, so that the sterilizing effect is performed to the filtering means which produces said effect by physical-chemical action, while the oligodynamic metal shows a microbicide action on the material restrained by the filter.

The possibility of the progressive defilement of the filter being removed, a constant sterilization of the liquid is attained without resorting to a direct action on the same liquid. The oligodynamic action of the metal is intended according to the invention, only to prevent contamination of the filter, by neutralizing the progressive defilement, so that the physical-chemical action of the filter remains unvaried in time, ensuring by this means the constant sterilization of the liquid. Moreover, the effect of the filter on the colloidal solutions prevents the metal ion from passing into the filtered liquid, thus attaining an absolute purity of said filtered liquid which will not contain the least trace of metal.

Of course the oligodynamic effect is the highest when the metallic agent consists of pure silver. The filter according to the invention may be embodied in the form of so-called filtering candle (or other form) made from tripoli, clay, porcelain and other like products, the porous mass being completely or partially impregnated with metallic silver or other metal with oligodynamic power, which coats the elements forming the porous mass and essentially all the capillarities which convey the liquid to be filtered through a filter with an exceedingly thin layer.

The adhesion of the metal to the filtering material is very strong. The thickness of the metal in the capillary spaces is regulated so as not to alter at all the amount of flow through the filter, while the area of contact is much extended and consequently the sterilizing effects both inside and outside the mass occur in the most sure and constant manner.

The process of metallization of the porous mass is carried out by introducing either by absorption or by pressure, or electrolytically or by other system a solution of silver nitrate or salts of other metals with oligodynamic power into the mass of the candle or filter and subsequently causing by cold chemical reactions with reducing agents, preferably gases with reducing power or milk sugar, formaldehyde tartrates, essence of lavanda or the like, the reduction of the metal salts to metal intimately bonded to the material forming the filter.

The metal and preferably the silver, reduced in cold conditions takes all the characteristics of the nascent metal; the crystallization is uniform and the layer, yet thin, does not show solutions of continuity.

The oligodynamic action is most considerable as the very great surface obtained by this process delivers a great quantity of disinfecting silver ions.

The applications of the filters according to the present invention are numerous as they serve very well for the filtration of suspected waters, fruit juices, milk, wines, vinegars, alcohols, medical substances and liquid foods in general.

An embodiment of the filter according to the invention is shown in the attached drawing, only by way of example.

A indicates the base of the filter having an outlet pipe, fastening nut and packing gasket, B the outer surface of the cylinder with oligodynamic metal, and C the partial, longitudinal cross section of the filter. The hatching indicates the porous mass which may be metallized either uniformly or with greater quantity of metal either inside or outside. D indicates the internal cavity of the filter which acts as a container of the liquid.

The advantages of the adoption of the present invention may be briefly restated as follows: There is no necessity for demounting the filters for periodic sterilizations. It is absolutely impossible for bacterial formation or vegetations to form either outside in the mass or inside the filter. The filter has unlimited life of service with constant sterilizing action.

In practice the manner of execution of the invention may vary without exceeding, however, the limits of the present invention.

What I claim and desire to secure by United States Letters Patent is:

1. Process of manufacturing a filter of fine porous material impregnated on all parts and throughout all pores with oligodynamic silver comprising forming a body of the fine porous material of a desired shape, impregnating said body with a solution of silver nitrate, allowing the impregnated body to season to ensure penetration of the solution throughout the body, reducing the silver by contacting the nitrate with formaldehyde gas whereby the silver adheres securely and completely to all parts of the body.

2. Process of manufacturing a filter of fine porous material impregnated on all parts and throughout all pores with oligodynamic silver comprising forming a body of the fine porous material of a desired shape, impregnating said body with a solution of silver nitrate by immersing said body in said solution, allowing the impregnated body to season to ensure penetration of the solution throughout the body, reducing the silver by contacting the nitrate with formaldehyde gas whereby the silver adheres securely and completely to all parts of the body.

3. Process of manufacturing a filter of fine porous material impregnated on all parts and throughout all pores with oligodynamic silver comprising forming a body of the fine porous material of a desired shape, impregnating said body with a solution of silver nitrate by immersing said body in said solution and subjecting the body to differential pressure, allowing the impregnated body to season to ensure penetration of the solution throughout the body, reducing the silver by contacting the nitrate with formaldehyde gas whereby the silver adheres securely and completely to all parts of the body.

ERNESTO MARIO CONCONI.